(12) United States Patent
Wilson et al.

(10) Patent No.: US 8,595,345 B2
(45) Date of Patent: Nov. 26, 2013

(54) ENHANCED PUSH NOTIFICATION SERVICES

(75) Inventors: Christopher Robert Wilson, Carpentersville, IL (US); Jin Woo Lee, Huntley, IL (US)

(73) Assignee: mFluent LLC, Algonquin, IL (US)

( * ) Notice: Subject to any disclaimer, the term of this patent is extended or adjusted under 35 U.S.C. 154(b) by 370 days.

(21) Appl. No.: 13/116,757

(22) Filed: May 26, 2011

(65) Prior Publication Data

US 2012/0303774 A1 Nov. 29, 2012

(51) Int. Cl.
*G06F 15/173* (2006.01)

(52) U.S. Cl.
USPC .......................................................... 709/223

(58) Field of Classification Search
USPC .......................... 709/223, 224–229, 204–207
See application file for complete search history.

(56) References Cited

U.S. PATENT DOCUMENTS

| | | | |
|---|---|---|---|
| 5,479,472 A | 12/1995 | Campana, Jr. et al. | |
| 5,631,946 A | 5/1997 | Campana, Jr. et al. | |
| 5,857,201 A | 1/1999 | Wright, Jr. et al. | |
| 5,889,839 A | 3/1999 | Beyda et al. | |
| 6,023,708 A | 2/2000 | Mendez et al. | |
| 6,085,192 A | 7/2000 | Mendez et al. | |
| 6,151,606 A | 11/2000 | Mendez | |
| 6,324,542 B1 | 11/2001 | Wright, Jr. et al. | |
| 6,654,786 B1 | 11/2003 | Fox et al. | |
| 6,708,221 B1 | 3/2004 | Mendez et al. | |
| 6,742,127 B2 | 5/2004 | Fox et al. | |
| 6,871,215 B2 | 3/2005 | Smith et al. | |
| 7,072,941 B2 | 7/2006 | Griffin et al. | |
| 7,111,044 B2 | 9/2006 | Lee | |
| 7,139,565 B2 | 11/2006 | Fiatal et al. | |
| 7,184,753 B2 | 2/2007 | Huynh | |
| 7,290,288 B2 | 10/2007 | Gregg et al. | |
| 7,433,920 B2 | 10/2008 | Blagsvedt et al. | |
| 7,519,720 B2 | 4/2009 | Fishman et al. | |
| 7,555,522 B2 | 6/2009 | Klassen et al. | |
| 7,769,400 B2 | 8/2010 | Backholm et al. | |
| 7,774,007 B2 | 8/2010 | Backholm et al. | |
| 2005/0169285 A1 | 8/2005 | Wills et al. | |
| 2006/0002317 A1* | 1/2006 | Punaganti Venkata | 370/310 |
| 2006/0173959 A1* | 8/2006 | McKelvie et al. | 709/204 |
| 2007/0268849 A1 | 11/2007 | Roy | |
| 2008/0247348 A1 | 10/2008 | Wilson et al. | |
| 2009/0221307 A1* | 9/2009 | Wolak et al. | 455/466 |
| 2010/0216434 A1* | 8/2010 | Marcellino et al. | 455/412.2 |

OTHER PUBLICATIONS

R. Fielding, et al., "Hypertext Transfer Protocol—HTTP/1.1" Network Working Group, Request for Comments: 2616, Jun. 1999.

(Continued)

*Primary Examiner* — Ruolei Zong
(74) *Attorney, Agent, or Firm* — McDonnell Boehnen Hulbert & Berghoff LLP

(57) ABSTRACT

A push notification server operates on a client device to manage push notifications that the client device receives from various push servers. In some embodiments, the push notification server may receive a notification message on behalf of an application and determine how to handle the notification message based on whether the application is operating on the client device. If the application is operating on the client device, the push notification server may deliver the notification message to the application. If the application is not operating on the client device, the push notification server may deregister the application from the push notification service, and/or display user information associated with the application in order to inform the user that the application is not operating.

20 Claims, 10 Drawing Sheets

(56) References Cited

OTHER PUBLICATIONS

D. Crockford, "The application/json Media Type for JavaScript Object Notation (JSON)," Network Working Group, Request for Comments: 4627, Jul. 2006.

Egloff, Andreas, "Ajax Push (a.k.a. Comet) With Java™ Business Integration (JBI)," 2007, JavaOne Conference, Session TS-8434, http://docs.huihoo.com/javaone/2007/services-and-integration/TS-8434.pdf, 26 pages.

Gravelle, Rob, "Comet Programming: Using Ajax to Simulate Server Push," WebReference, http://www.webreference.com/programming/javascript/rg28/index.html, Mar. 6, 2009, 12 pages.

Krill, Paul, "AJAX alliance recognizes mashups," Published on Infoworld (http://www.infoworld.com), Sep. 24, 2007, 3 pages.

* cited by examiner

ENHANCED PUSH NOTIFICATION SERVICES

BACKGROUND

Traditional client-server communication is based on "pull" messaging. Under this paradigm, in order to access information at a server device, a client device transmits a request for the information to the server device. In response to this request, the server device may transmit a copy of the requested information. Pull messaging may be effective for some applications, such as file downloads and web browsing. However, it is typically inefficient for applications in which information for the client device arrives asynchronously, such as email and instant messaging applications.

An alternative approach, called "push" messaging, has also been proposed. Using push messaging, a client device registers with a server device, and the server device transmits information to the client device as that information arrives at the server device. Nonetheless, despite exhibiting some advantages over pull messaging, push messaging can also be inefficient in many practical scenarios.

OVERVIEW

In order to overcome the inefficiencies of both pull and push messaging, the methods, devices, and systems herein may involve various enhancements to push messaging. Some of these enhancements may include aspects of pull messaging, thereby combining push and pull messaging when doing so is appropriate.

Wireless communication devices, such as mobile phones, tablet computers, and laptop computers, may operate as client devices. However, the network capacity available to wireless communication devices may be limited by a relatively low-speed wireless air interface link connecting them to other networks, such as the Internet. Further, some wireless service providers charge users of wireless communication devices based on minutes of use and/or the volume of data communicated via these wireless air interface links. As a result, it may be desirable to minimize, or at least reduce, the communication between wireless communication devices and server devices.

In at least some embodiments, push messaging may be enhanced by employing a push notification server on a client device. The push notification server may, for example, receive push notifications on behalf of multiple applications capable of operating on the client device. Thus, the push notification server may receive email notifications from email servers, instant messaging notifications from instant messaging servers, and so on.

Additionally, the push notification server may communicate with a push notification gateway that could be located on a different network from the client device. The push notification gateway, in turn, may receive push notifications from the various push services (e.g., email, instant messaging, etc.) with which the client has subscribed. By aggregating push notifications on one or more communication sessions between the push notification server (which is operating on the client device) and the push notification gateway, push messaging between these devices can be more precisely managed and controlled.

An example of a possible enhancement to push messaging that this architecture allows involves management of connection termination messages. When an application operating on a client device subscribes to a push service from a particular push server, the application may be considered to have a "connection" with this push server. For various reasons, a push server may transmit a notification to the client device indicating that the push server has terminated the client device's connection, thus ending the client device's ability to receive notifications from the push server.

For instance, if the push server is an instant messaging server, it may allow only one client device at a time to log in to a particular instant messaging account. If a user of a wireless communication device logs in to the instant messaging account via the wireless communication device, then logs into the instant messaging account via a desktop computer, the instant messaging server may transmit a connection termination message to the wireless communication device.

Accordingly, a push notification server that is operating on such a client device may receive such a connection termination message. The connection termination message may seek to terminate an application that is registered, via the push notification server, with a push notification service. Possibly in response to receiving the connection termination message, the push notification server may determine whether the application is operating on the client device.

If the application is operating on the client device, the push notification server may notify the application that the connection termination message was received (e.g., the push notification server may deliver the connection termination message, or a variation thereof, to the application). On the other hand, if the application is not operating on the client device, the push notification server may deregister the application from the push notification service. By deregistering the application in this fashion, the push notification server may no longer listen for and/or react to notifications for the application.

Additionally, if after this deregistration takes place there are no more applications on the client device registered to receive push notifications, the push notification server may seek to prevent the client device from receiving any further push notifications. For example, the push notification server may inform the push notification gateway that the push notification gateway should not transmit push notifications to the client device. As a result, network capacity between the client device and the push notification gateway is conserved.

In another example embodiment, the push notification server operating on a client device may display user information on behalf of an application when the application is not operating on the client device. The user information may be related to an account that the user of the client device has established to use the application. To this end, the push notification server may obtain the user information. This user information may be a userid, an email address or some other information associated with a user. The application may be registered with a push notification service facilitated by the push notification server, and the application may be capable of operating on the client device.

Possibly in response to obtaining the user information, the push notification server may determine that the application is not operating on the client device. There are several potential scenarios in which an application that is not operating might remain registered with a push notification service. For instance, the application may have terminated but did not deregister with the push notification service prior to terminating. Alternatively, the application may have attempted to deregister with the push notification service prior to terminating, but failed to do so properly (e.g., a message indicating the deregistration may have been lost on the network between the client device and the push notification gateway). Regardless, the push notification server may display at least a portion of the user information on a user interface of the client device on behalf of the application. In this way, the user is notified regarding activity involving (or information regarding) their account with a push server, without the application having to be launched.

These and other aspects and advantages will become apparent to those of ordinary skill in the art by reading the following detailed description, with reference where appropriate to the accompanying drawings. Further, it should be understood that this overview and the description throughout this document is merely for purposes of example and is not intended to limit the scope of the invention as claimed.

DESCRIPTION

I. Network Architecture

Figure 1:
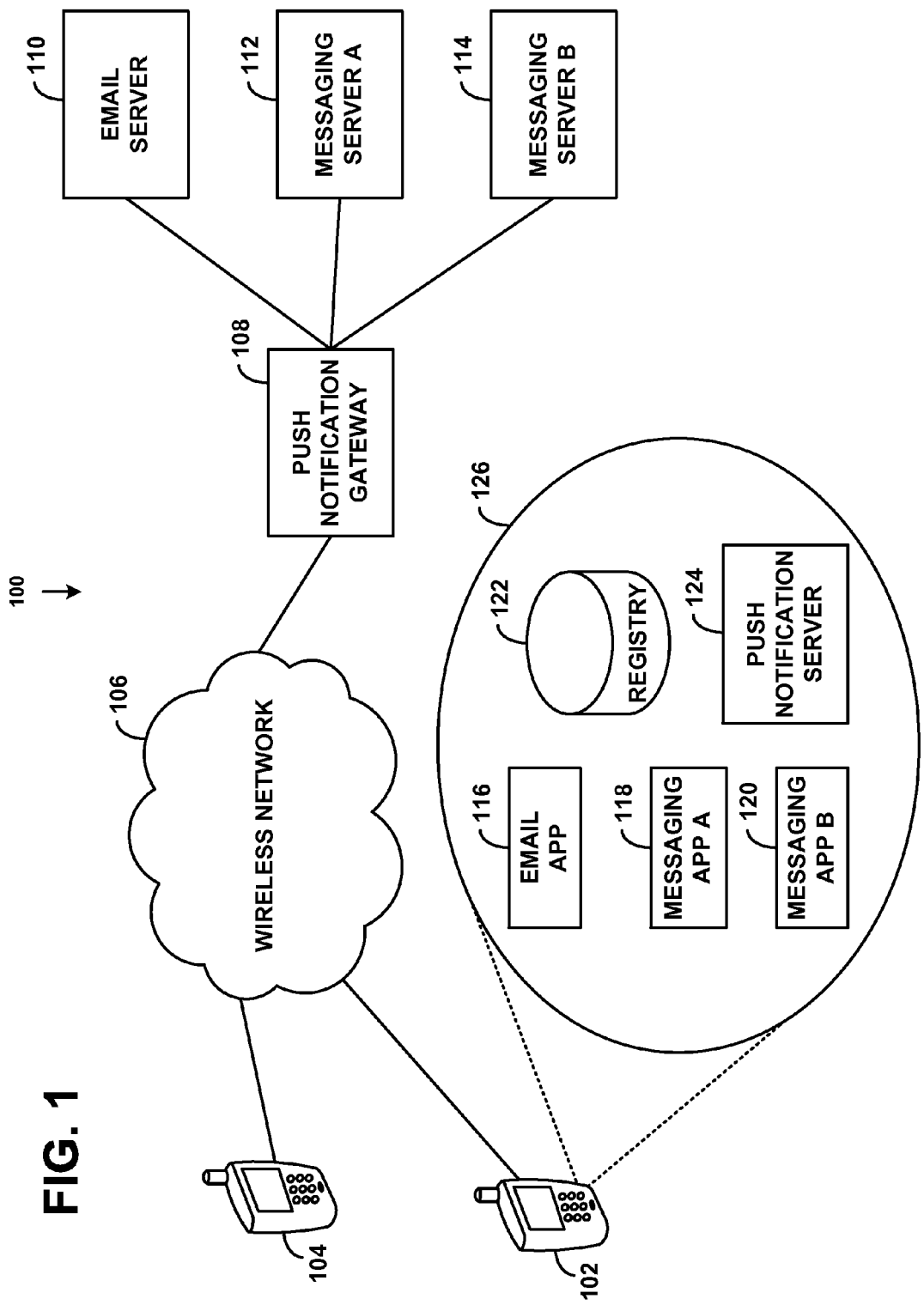
FIG. 1 depicts a communication system, in accordance with an example embodiment.

FIG. 1 is a simplified block diagram of a communication system 100 in which example embodiments can be employed. Client devices 102 and 104, which are depicted as mobile phones, but could be any type of client devices, are capable of communicating with server devices, other client devices, and any additional type of network node, via wireless network 106.

Wireless network 106 may operate according to one or more wireless technologies, such as Code Division Multiple Access (CDMA), Worldwide Interoperability for Microwave Access (WIMAX®), Universal Mobile Telecommunications System (UMTS®), Long Term Evolution (LTE®), IDEN®, or 802.11 (Wifi). Thus, wireless network 106 may be a wide-area, metropolitan-area, local-area, or personal-area wireless network. However, in some embodiments, client devices 102 and 104 may not support wireless networking, and as a result wireless network 106 could be replaced with a wireline network.

Wireless network 106 may communicatively connect client devices 102 and 104 to email server 110, messaging server A 112, messaging server B 114, and possibly other servers as well. Client devices 102 and 104 may be able to communicate directly with each of email server 110, messaging server A 112, and messaging server B 114. Client devices 102 and 104 may also be able to communicate with these servers via push notification gateway 108.

Email server 110, messaging server A 112, messaging server B 114, and push notification gateway 108 may be located with one another in the same network, or in two or more different networks. For example email server 110, messaging server A 112, messaging server B 114, and push notification gateway 108 may each be located in a different private network, and these private networks may be connected to one another by a public network such as the Internet.

Email server 110 may operate according to one or more types of standard or proprietary email protocols, such as the Post Office Protocol (POP), the Internet Message Access Protocol (IMAP), MICROSOFT EXCHANGE®, or various types of web-based email protocols. Messaging servers A and B may operate according to one or more types of standard or proprietary messaging protocols. These messaging protocols may be instant messaging protocols, such as the eXtensible Messaging and Presence Protocol (XMPP), or other types of messaging protocols.

As shown in callout 126, client device 102 may contain various modules that supply client device 102 with functionality (client device 104 may contain similar modules that are not show for purposes of simplicity). These modules may be, for instance, software programs that work independently or in conjunction with one another to supply the functionality. In some cases, this functionality may include functionality for communicating with one or more of email server 110, messaging server A 112, and messaging server B 114. For example, an email application 116 (denoted as "email app"), messaging application A 118 (denoted as "messaging app A"), and messaging application B 120 (denoted "messaging app B") may be able to communicate with email server 110, messaging server A 112, and messaging server B 114, respectively.

Client device 102 may also include a registry 122 and a push notification server 124. Registry 122 may serve as a database in which one or more of email application 116, messaging application A 118, and messaging application B 120 store configuration information, run-time data, or anything else that needs to be shared between these applications and other programs operated on client device 102. In some embodiments, registry 122 can be a short message service (SMS) registry, a file, a file system, or a relational or object database.

As will be described in more detail below, push notification server 124 may communicate with push notification gateway 108 on behalf of email application 116, messaging application A 118, and/or messaging application B 120 to facilitate enhanced push notification services. As part of this communication, push notification server 124 may, from time to time, store information in registry 122 and/or access information stored in registry 122. Such information may relate to one or more of email application 116, messaging application A 118, and messaging application B 120.

In general, the communication system of FIG. 1 is illustrative. In such a communication system, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIG. 1 should not be viewed as limiting with respect to the present embodiments.

For example, in addition to email and messaging applications, client device 102 may be capable of operating other types of applications that benefit from enhanced push notification services. These applications may include location-based applications, telematics applications, sensor-based applications, multimedia applications, and some types of web-based applications.

II. Client Device Functionality

Figure 2:
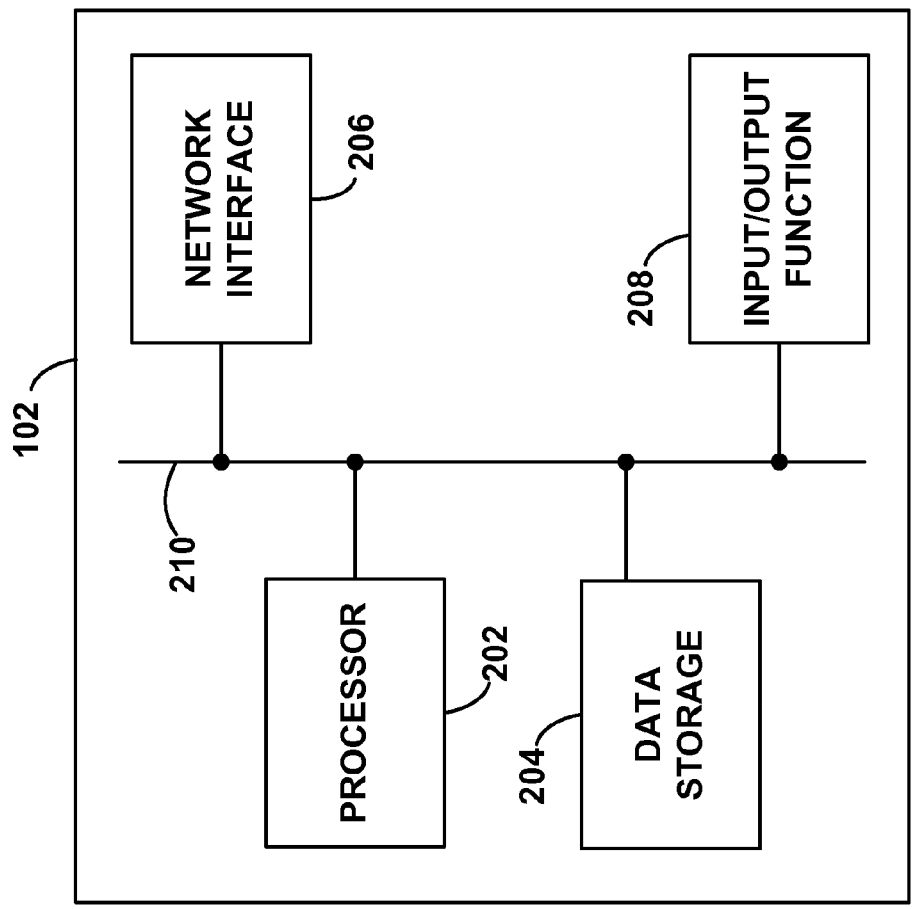
FIG. 2 is a block diagram of a client device, in accordance with an example embodiment.

FIG. 2 is a simplified block diagram exemplifying client device 102, and illustrating one or more of the functional elements that may be found in a client device arranged to operate in accordance with the embodiments herein. Client device 102 could be any type of device capable of receiving push notifications. Thus, as noted above, client device 102 could be a wireless communication device (e.g., a mobile phone, a tablet computing device, a laptop computer), a desktop computing device, or a server device. For purposes of illustration, client device 102 may be described as a mobile phone. Nonetheless, it should be understood that the description of client device 102 and its components may apply to other types of client devices.

Client device 102 may include a processor 202, a data storage 204, a network interface 206, and an input/output function 208, all of which may be coupled by a system bus 210 or a similar mechanism. Processor 202 may include one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile data storage and can be integrated in whole or in part with processor 202. Data storage 204 may store program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. Therefore, data storage 204 may be a non-transitory computer-readable medium, having stored thereon program instructions that, if executed by client device, cause the client device to carry out any of the methods, processes, or functions disclosed in this specification or the accompanying drawings.

Network interface 206 may be an interface for a wireline connection, such as an Ethernet, Token Ring, or T-carrier connection. Alternatively or additionally, network interface 206 may be an interface for a wireless connection, such as IEEE 802.11 (Wifi), BLUETOOTH®, or a wide-area wireless connection. However, network interface 206 may support other forms of physical layer connections and other types of standard or proprietary communication protocols. Furthermore, network interface 206 may comprise multiple physical communication interfaces.

Input/output function 208 may facilitate user interaction with example client device 102. Input/output function 208 may comprise one or more of any type of input device, such as a keypad, a keyboard, a mouse, a scroll wheel, a microphone, a joystick, a touch screen, a switch, a button, etc. Similarly, input/output function 208 may comprise one or more of any type of output device, such as a video screen, a monitor, a printer, a speaker, a light emitting diode (LED), etc. Additionally or alternatively, example client device 102 may support remote access from another device, via network interface 206 or via another interface (not shown), such an RS-232 or Universal Serial Bus (USB) port.

III. Push Messaging

In an example embodiment, push messaging involves a server device initiating a transmission to a client device without the client device requesting the specific information that is transmitted. This is in contrast to traditional pull messaging, in which a client device requests the specific information from the server device and the server device transmits that specific information to the client device in response to the request. However, push messaging may involve the client device transmitting a request to the server device to identify the general type of information that the client device is seeking When the server device determines that information of this general type is available, the server device may asynchronously transmit the information to the client device.

Push messaging may be facilitated by a "subscribe/notify" arrangement. The client device may subscribe to receive information that may subsequently become available to the server device. If and when this information becomes available to the server device, the server device may transmit a notification to the client device at some point thereafter, indicating the availability of the information. In some cases, the notification may include a copy of at least some of the information.

One example of how push messaging can facilitate efficient communication is with email protocols. For instance, an email user may have an account with an email service that is hosted on an email server. Email messages sent to the user arrive at the email server and are stored therein. When the user accesses the email server via a client device, the email server may transmit copies of these email messages to the client device. Due to the asynchronous nature of email, email protocols may not be efficiently handled by pull messaging. For example, email message arrivals may be bursty, resulting in many email messages arriving in a short period of time, and then minutes or hours passing before further email messages arrive. If the client device periodically accesses the email server, or if the user manually accesses the email server from time to time, processing capacity at the client device and the server device, as well as network capacity in between these devices could be wasted.

As an alternative, the client device may subscribe to the email server. Then, when email messages arrive for the user, the email server may notify the client device of the arrival of the email messages. Once notified, the client device may request copies of the email messages from the email server. In this way, processing capacity and network capacity used to handle these email messages are conserved. Additionally, the email server may be configured to transmit no more than one notification per n seconds to any given client device. This allows multiple email messages to arrive at the email server before the email server transmits a notification to the client device, conserving further processing power and network capacity.

Another example of how push messaging can facilitate efficient communication is with messaging protocols. In particular, instant messaging protocols may include support for substantially real-time text communication between two or more users. Some instant messaging protocols also support file sharing and audio and/or video conferencing.

For example, an instant messaging user may have an account with an instant messaging service that is hosted on an instant messaging server. Instant messages sent to the user arrive at the instant messaging server. If the user is logged on to the instant messaging server, the instant messaging server may transmit these instant messages to an instant messaging application on the user's client device.

Alternatively, instant messaging services may use a subscribe/notify arrangement. For example, the client device may subscribe to the instant messaging server. Then, when instant messages arrive for the user, the instant messaging server may notify the client device of the arrival of the instant messages. Once notified, the client device may request copies of the instant messages from the instant messaging server. In this way, instant messages are delivered in a timely fashion while processing capacity and network capacity are conserved.

In some cases the notifications discussed herein may share the same communication channel as the information that a server device transmits to a client device. This arrangement will be referred to as in-band communication. Alternatively, the server device may transmit this information on a different communication channel. This alternate arrangement will be referred to as out-of-band communication. Instant messaging services may use in-band communication for notifications, because the type of communication used with many instant messaging protocols comprises short strings of text. Thus, these strings of text can be delivered with the notification or may serve as the notification itself. On the other hand, email services may use out-of-band communication for notifications. Because email messages can be quite large, it may not be efficient to push entire email messages to the client device along with their respective notifications.

Turning back to FIG. 1, the use of push notification server 124 and push notification gateway 108 as a conduit for push notifications can increase the efficiency of push communications. For example, email server 110, messaging server A 112 and messaging server B 114 may be configured to transmit notifications to client device 102 via push notification gateway 108. Push notification gateway 108, in turn, may transmit these notifications in a multiplexed fashion over a push channel to client device 102. At client device 102, push notification server 124 may receive the multiplexed notifications, demultiplex these notifications, and deliver them to the appropriate application operating on client device 102.

During any of these transactions, the format of the notifications may be changed. For instance, push notification gateway 108 may translate notifications received from email server 110, messaging server A 112, and/or messaging server B 114 to a common format for transmission to client device 102. Push notification server 124 may further translate the notifications from the common format to formats supported by email application 116, messaging application A 118 and messaging application B 120, respectively.

IV. Example Message Flows

The message flows of FIGS. 3, 4A, 4B, 5, 6, and 7 provide examples of how push notification server 124 and push notification gateway 108 may operate to enable efficient push communication. Each of these message flows depict possible sequences of messages and associated processing that may occur in the embodiments herein. It is to be understood, however, that the depicted sequences of messages may be merely illustrative, as additional or alternative messages could be used.

Further, the messages are named based on a general description of their functionality, but their names are not intended to be limiting. Thus, for instance, a message with a particular name might map to different types of messages employed by different communication protocols. Moreover, the contents of these messages, when included, are also for purposes of example. Embodiments incorporating the messages depicted in these figures may include more or less information of the same or of a different category than shown.

Also, each message depicted in these figures may relate to a form of communication over a packet-switched network, such as a private Internet Protocol (IP) network or the Internet. Thus, each message may be embodied by one or more packets, or streams of packets, transmitted between networked devices.

a. Device Registration

Figure 3:
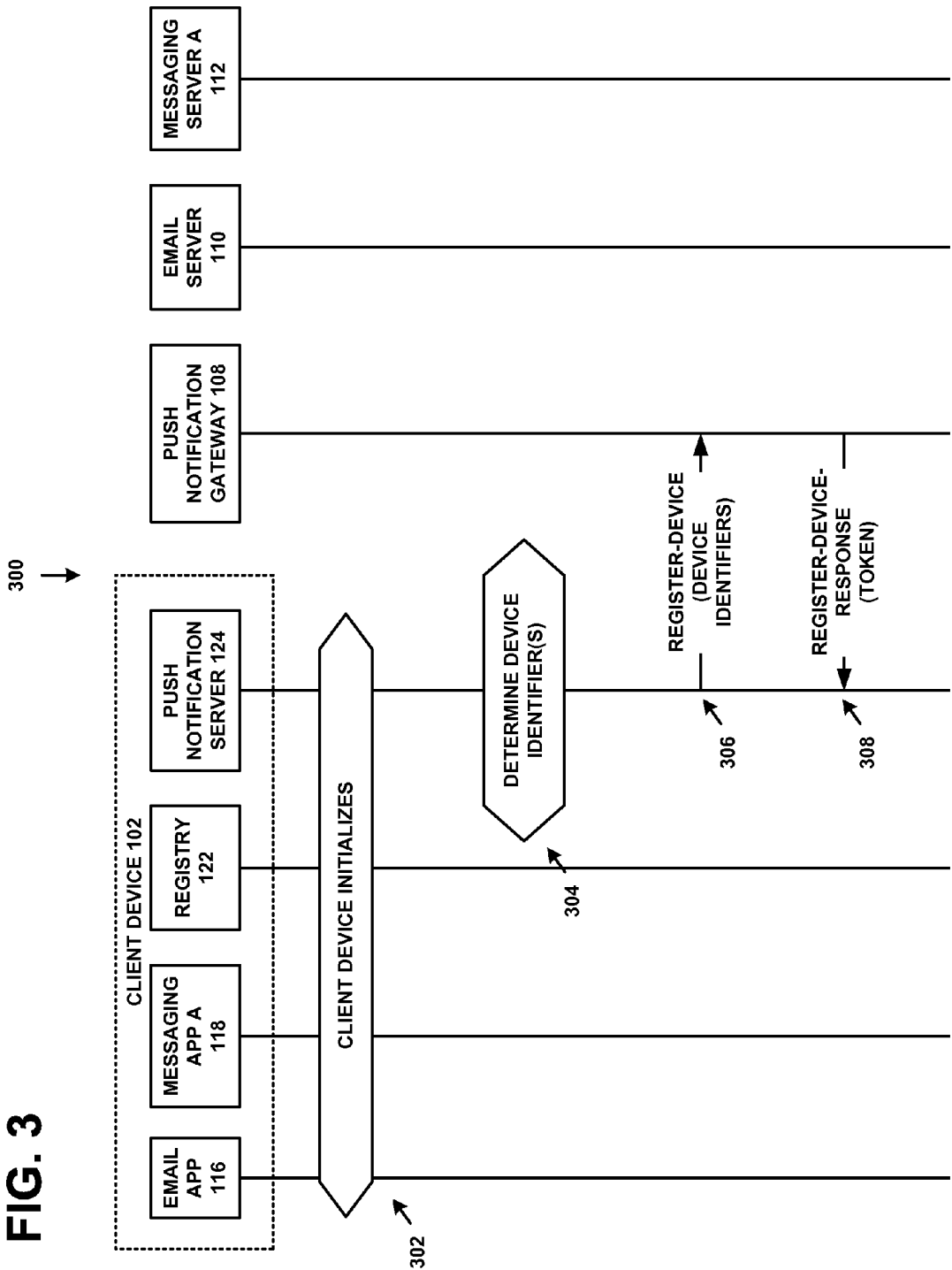
FIG. 3 is a first message flow, in accordance with an example embodiment.

In FIG. 3, message flow 300 depicts client device 102 communicating with push notification gateway 108. As shown in FIG. 1, client device 102 may include a number of modules, such as email application 116, messaging application A 118, registry 122, and push notification server 124. Messaging application B 120 and messaging server B 114 are omitted from FIG. 3, as well as the remaining figures, for purposes of simplicity.

At step 302, client device 102 may initialize. This initialization process may include one or more steps, such as client device 102 booting, reading configuration files, and/or initializing network interfaces. During or shortly after booting, client device 102 may launch push notification server 124. Email application 116 and/or messaging application A 118 may also be launched at this point or later.

At step 304, push notification server 124 may determine one or more identifiers of client device 102. These identifiers may be, for example, an International Mobile Equipment Identity (IMEI), Electronic Serial Number (ESN), Mobile Equipment Identifier (MEID), Mobile Directory Number (MDN), or some form of data-link layer address, such as an IEEE 802 address (e.g., an address in the Ethernet or Wifi media-access (MAC) address format). Push notification server 124 may determine these addresses by querying an appropriate application programming interface (API) supported by client device 102, or by reading these addresses from memory. In some embodiments, push notification server 124 may primarily use the IMEI and MDN of client device 102. In these embodiments, the IMEI may be used as a hardware identifier to signify client device 102, while the MDN may be used as a user identifier, to signify the user of client device 102. The MDN may take the form of a phone number assigned to the user.

At step 306, push notification server 124 may transmit a REGISTER-DEVICE message to push notification gateway 108. This message may include one or more identifiers of client device 102 (e.g., the IMEI and MDN discussed above). Push notification server 124 may use the HyperText Transfer Protocol (HTTP) for communicating with push notification gateway 108. Thus, the REGISTER-DEVICE message could be formed based on an HTTP GET request to a uniform resource locator (URL). An example of such a URL may be:

http://[SERVER]:[PORT]/register?imei=
    AB0937735DF&mdn=18475551212&.rand=
    12778947674

In this example URL, the SERVER field may include a domain name system (DNS) address or IP address of push notification gateway 108. The PORT field may indicate a Transmission Control Protocol (TCP) or User Datagram Protocol (UDP) port at push notification gateway 108, on which push notification gateway 108 listens for REGISTER-DEVICE messages. The example URL also indicates that the IMEI of client device 102 is AB0937735DF, and that the MDN assigned to the user of client device 102 is 18475551212. In this example, the URL further includes an optional random number, 12778947674, that can be used as a "cache buster." Use of such a random number may prevent one or more HTTP proxy devices between client device 102 and push notification gateway 108 from returning cached content.

At step 308, push notification gateway 108 may transmit a REGISTER-DEVICE-RESPONSE message to push notification server 124. The format of the REGISTER-DEVICE-RESPONSE message may be that of an HTTP response, such as an HTTP 200 OK message. An example payload of the REGISTER-DEVICE-RESPONSE message may include the following information.

```
Content-Type: application/json;charset=utf-8
...
"token" : "QmFzZTY0W0JpbmFyeSBEYXRhXQ==",
"idleTimeout" : "36000"
```

In this example, the Content-Type field indicates that the message is to be interpreted as a JavaScript Object Notation (JSON) message with the Universal Character Set Transformation Format 8-bit (UTF-8) character set. It should be appreciated that JSON is a standard for text-based, human-readable information exchange using data structures such as associative arrays. The data structure following the Content-Type field includes a token that has the value "QmFzZTY0W0JpbmFyeSBEYXRhXQ==", and specifies an idle timeout with the value 36000. The token may be a locally or globally unique device identifier that push notification gateway 108 assigns to client device 102. The idle timeout may be the number of seconds that push notification gateway 108 will maintain an idle session between push notification server 124 and push notification gateway 108.

Thus, the HTTP GET request may establish a long-lived TCP/IP socket between push notification server 124 and push notification gateway 108. A long-lived socket used for push communication may be based to some extent on technologies such as COMET, Asynchronous JavaScript and XML (AJAX), HyperText Markup Language 5 (HTML 5) server-sent events, or some other mechanism. This socket may be used for further communication between push notification server 124 and push notification gateway 108, such as notifications transmitted by push notification gateway 108. If the socket is idle for 36000 seconds, push notification gateway 108 may close the socket, rendering it unavailable for communication. In order to prevent the socket from being closed, push notification server 124 may periodically, or from time to time, poll push notification gateway 108 via the socket. This poll may be initiated by push notification server 124 transmitting an HTTP GET request on the open socket to a URL such as:

http://[SERVER]:[PORT]/mpns/comet?token=
QmFzZTY0W0JpbmFyeSBEYXRhXQ==&rand=
12778947675

In this URL, the SERVER field may include a DNS address or IP address of push notification gateway 108, the PORT field may indicate a TCP or UDP port at push notification gateway 108 on which push notification gateway 108 listens for polling messages. The URL may also include the token assigned to client device 102 and a random number used as a cache buster. If for some reason push notification server 124 fails to poll push notification gateway 108 before push notification gateway 108 closes the socket, push notification server 124 may rapidly open a new socket to push notification gateway 108. Then, push notification server 124 and push notification gateway 108 may use this new socket for transmitting notifications and polls.

The number and/or frequency of this polling may be configurable at push notification server 124. Thus, in some embodiments, the polling interval (i.e., the time transmission of between two sequential polling messages) may increase or decrease based on various considerations. One of these considerations may be the remaining battery life of client device 102. If client device 102 has ample remaining battery life, push notification server 124 may poll push notification gateway 108 more frequently. On the other hand, if client device 102 exhibits low battery life, push notification server 124 may poll push notification gateway 108 less frequently.

Since the transmission of each polling message requires processing at client device 102, the fewer polling messages that push notification server 124 transmits, the less battery power may be consumed. Thus, adjusting the polling interval in this fashion may conserve battery life. However, if client device 102 is being charged or otherwise using an external or non-battery power source, push notification server 124 may decrease the polling interval accordingly. It should be understood that push notification server 124 may determine the remaining battery life of client device 102 and/or whether client device 102 is being charged by querying appropriate APIs, receiving an interrupt, reading the state of client device 102 from memory, or via some other mechanism.

b. Application Registration

Figure 4A:
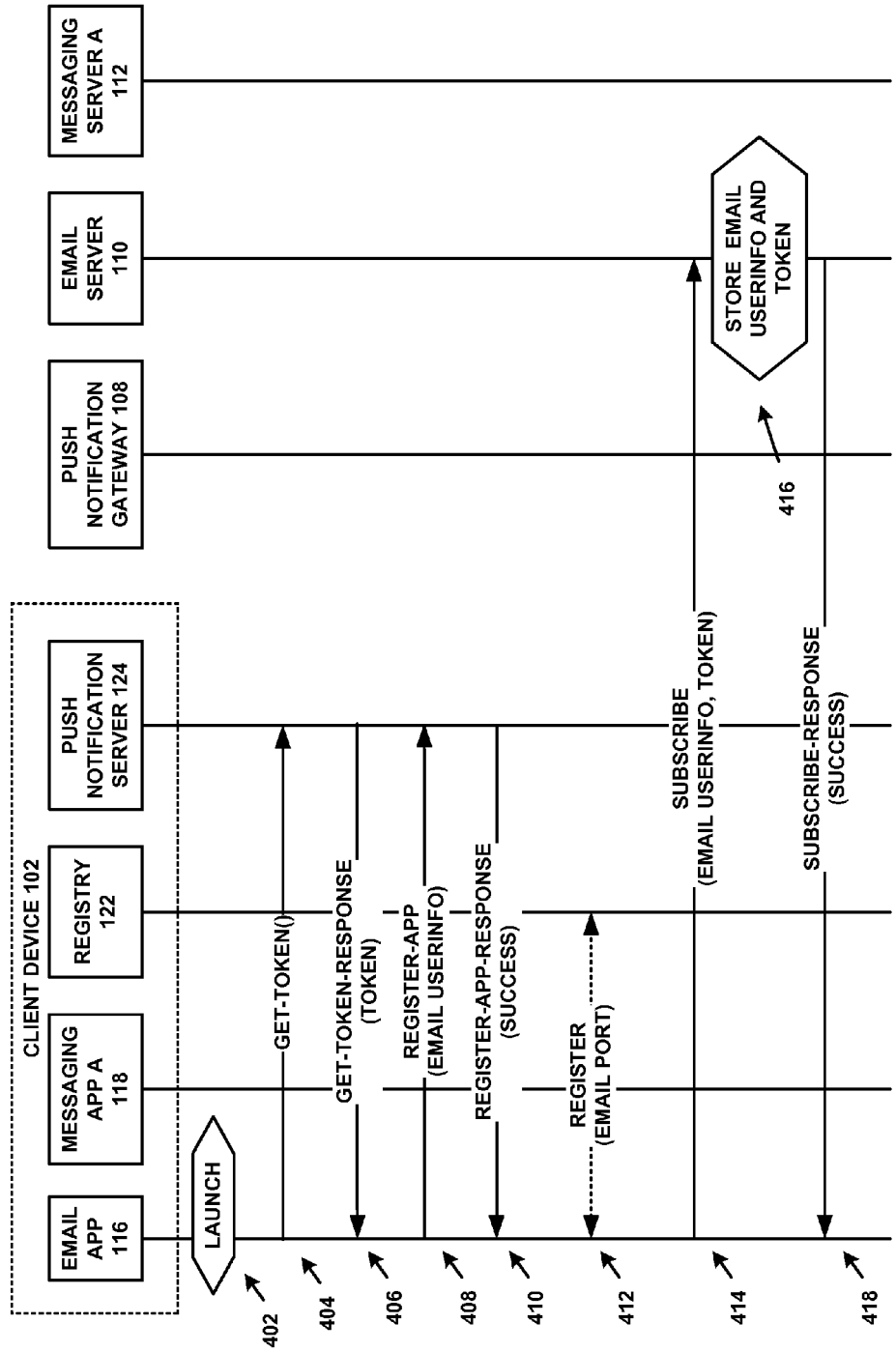
FIG. 4A is a second message flow, in accordance with an example embodiment.
Figure 4B:
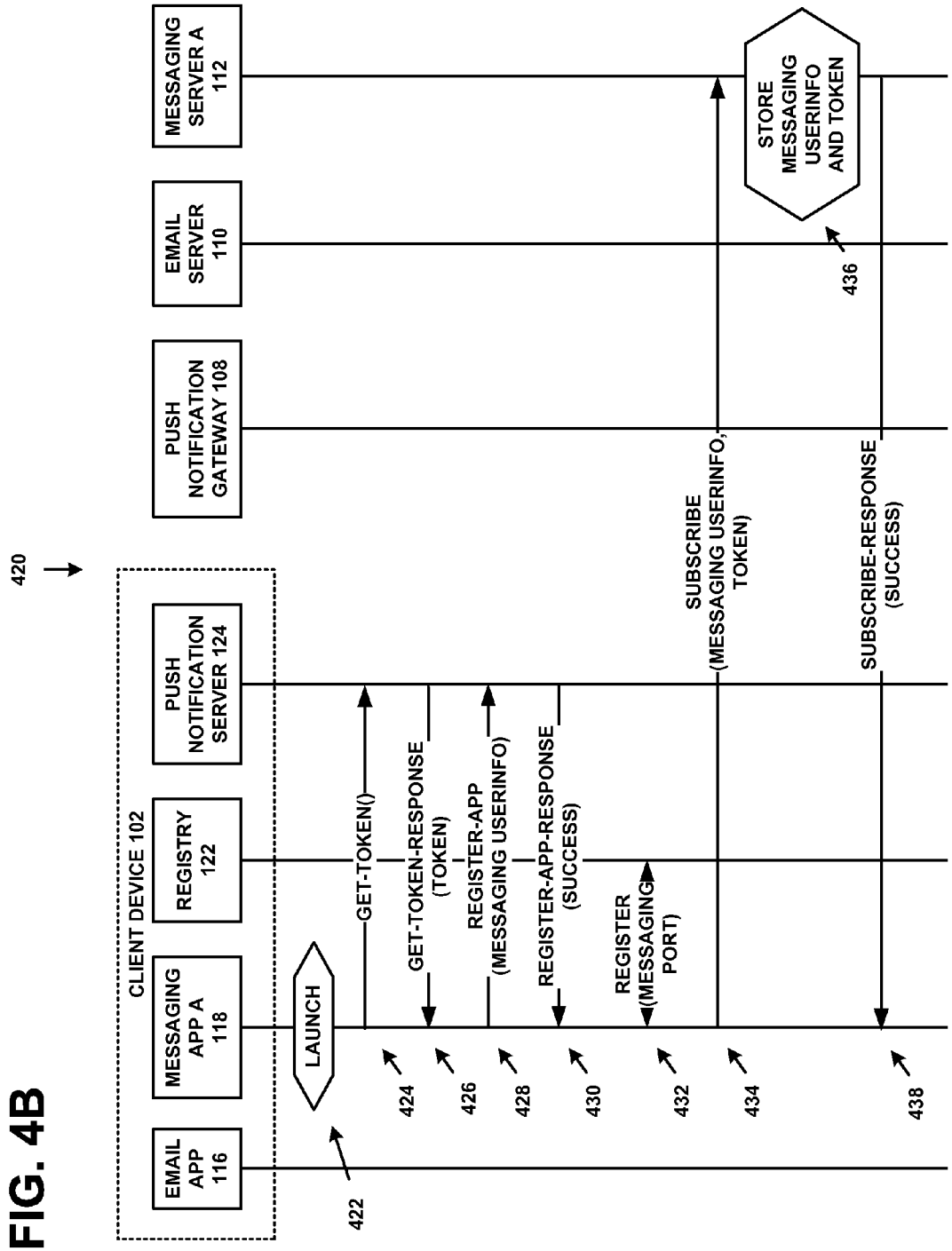
FIG. 4B is a third message flow, in accordance with an example embodiment.

FIGS. 4A and 4B depict possible ways in which email application 116 and messaging application A 118 can register with push notification server 124 and subscribe to notifications from email server 110 and messaging server A 112, respectively.

In FIG. 4A, message flow 400 includes step 402, in which email application 402 may launch. As noted above, email application 116 may launch during initialization of client device 102 (e.g., when client device 102 boots). Alternatively, email application 116 may launch manually (e.g., based on user intervention), or automatically (e.g., based on some other trigger).

After launching, at step 404, email application 116 may request a token from push notification server 124. The request may occur either before or after step 308, in which push notification server 124 receives the token. The request may involve email application 116 transmitting a GET-TOKEN message to push notification server 124. (It should be understood that even when an application and push notification server 124 are both operating on the client device 102, communication between these modules may be referred to as transmissions, despite this communication not necessarily leaving client device 102.) Alternatively, step 404 may involve email application 116 invoking a GET-TOKEN procedure call, or some other way of requesting the token from push notification server 124. If push notification server 124 does not yet have the token at step 404, email application 116 may pause until push notification server 124 is able to provide the token, or email application 116 may continue operating without the token.

At step 406, push notification server 124 may provide the requested token in a GET-TOKEN-RESPONSE message. If the token was requested via a procedure call, push notification server 124 may return the token to email application 116 via the procedure call. After receiving the token, email application 116 may store it for later use.

At step 408, email application 116 may transmit a REGISTER-APP message to push notification server 124. This request may seek to register email application 116 with push notification server 124 so that push notification server 124 receives notifications on behalf of email application 116. The REGISTER-APP message may include email user information (denoted "email userinfo" in FIG. 4A), which could be one or more of an email address, userid, password, or some other identifier of the user of email application 116 or of the user's account with email server 110.

At step 410, push notification server 124 may transmit a REGISTER-APP-RESPONSE message to email application 116. As shown in FIG. 4A, this message may indicate that the registration was a success. However, if the registration fails for some reason, this message may indicate that a failure occurred.

In some embodiments, steps 404, 406, 408, and 410 may be combined in some fashion. For instance, steps 404 and 408 may be combined so that email application 116 requests the token and registers in one message, and steps 406 and 410 may be combined so that push notification server 124 provides the token and indicates the outcome of the registration in one message.

At step 412, email application 116 may optionally register a port with registry 122. (The optional nature of some messages is denoted by the messages being depicted with dotted lines. However, messages denoted with solid lines may be optional as well.) Email application 116 may then use this port to receive notifications. For example, email application 116 may listen to this port for notifications from push notification server 124.

In step 412, the port is denoted "email port" to indicate that email notifications may be delivered via this port. In some embodiments, registry 122 may be an SMS registry, and the port may be an SMS port. Thus, push notification server 124 may translate email notifications arriving at client device 102 to an SMS-compatible format before delivering them to email application 116. This SMS-compatible format may be, for example, a Wireless Messaging API (WMA) TextMessage object. It should be understood that WMA may provide a standard interface for accessing SMS based services, functions, and data on some client devices. It should also be understood that this port registration could occur at other times. For instance, email application 116 may register a port with registry 122 as email application 116 launches.

At step 414, email application 116 may subscribe to notifications from email server 110 by transmitting a SUBSCRIBE message to email server 110. This SUBSCRIBE message may include the email user information and the token. At step 416, email server 110 may store the email user information and token, and associate these data. In some embodiments, email server 110 may use the stored email user information and/or token to determine where to deliver email notifications for the user of client device 102. At step 418, email server 110 may transmit a SUBSCRIBE-RESPONSE message to email application 116, indicating that email application 116 has successfully subscribed to the push email service.

Message flow 420 of FIG. 4B, which involves messaging application A 118, is similar to message flow 400 of FIG. 4A. Thus, message flow 420 will be described in slightly less detail than message flow 400. At step 422, messaging application A 118 may launch. Like email application 116, messaging application A 118 may launch during initialization of client device 102, manually, or automatically. After launching, at step 424 messaging application A 118 may request, from push notification server 124, the same token provided to email application 116 at step 406. Thus, messaging application A 118 may transmit a GET-TOKEN message to push notification server 124. At step 426, push notification server 124 may provide the requested token in a GET-TOKEN-RESPONSE message.

At step 428, messaging application A 118 may transmit a REGISTER-APP message to push notification server 124. The REGISTER-APP message may include messaging user information (denoted "messaging userinfo" in FIG. 4B), which could be one or more of an email address, userid, or some other identifier of the user of messaging application A 118. At step 430, push notification server 124 may transmit a REGISTER-APP-RESPONSE message to messaging application A 118, indicating either success or failure of the registration. Similar to steps 404, 406, 408, and 410 of message flow 400, steps 424, 426, 428, and 430 may be combined in some fashion.

At step 432, messaging application A 118 may register a port with registry 122, and use this port to receive messaging notifications. At step 434, messaging application A 118 may subscribe to notifications from messaging server A 112 by transmitting a SUBSCRIBE message to messaging server A 112. This SUBSCRIBE message may include the messaging user information and the token. At step 436, messaging server A 112 may store the messaging user information and token, and associate these data. At step 438, messaging server A 112 may transmit a SUBSCRIBE-RESPONSE message to messaging application A 118, indicating that messaging application A 118 has successfully subscribed to the push messaging service.

c. Notification Delivery

Figure 5:
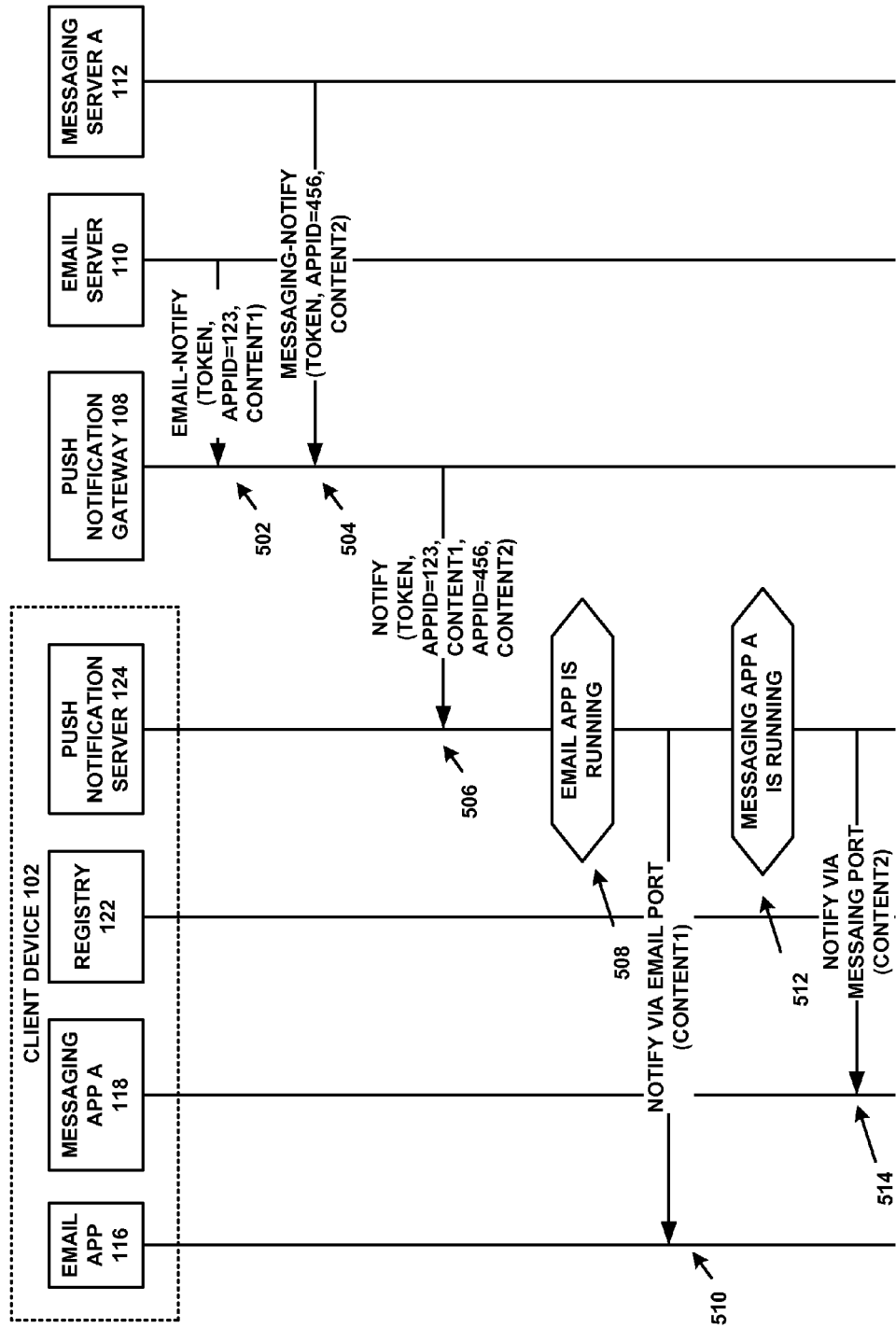
FIG. 5 is a fourth message flow, in accordance with an example embodiment.

Message flow 500 of FIG. 5 depicts examples of both email and messaging notifications being delivered to email application 116 and messaging application A 118 via push notification gateway 108 and push notification server 124. At step 502, email server 110 may transmit an EMAIL-NOTIFY message to push notification gateway 108. The transmission of this message may be triggered by an email message for the user of client device 102 arriving at email server 110, or some other state change occurring at email server 110. Email server 110 may be configured to transmit some or all notification messages for the user of client device 102 to push notification gateway 108. This configuration may be been manually established, or may have occurred automatically in response to receiving a SUBSCRIBE message from client device 102, such as the SUBSCRIBE message shown in step 414.

The EMAIL-NOTIFY message may contain a copy of the token, an AppID, and/or additional content. The AppID may be a number, text string, or another type of indicator that denotes that the sender of the EMAIL-NOTIFY message operates according to a particular type of email service. For instance, some email services may use one AppID, while other email services may use a different AppID. Nonetheless, inclusion of an AppID in an EMAIL-NOTIFY message is optional, as push notification gateway 108 may be able to infer the AppID of the email service from other information in the EMAIL-NOTIFY message, such as the source IP address of the EMAIL-NOTIFY message.

The EMAIL-NOTIFY message may also contain additional content (denoted "content1"). The content may include one or more strings and/or fields. These strings and/or fields may be of human-readable text, non-human-readable text, or in a binary format. For example, the additional content may include a textual message that is to be displayed to the user of client device 102. An example of such a textual message may be "You have a new email message". Alternatively or additionally, the textual message may include information from one or more headers of a new email message, such as the sender's name or email address, and/or at least part of the subject line. For instance, the textual message might include the text "You have a new email from Bob123@example.com", or "Bob123@example.com writes 'Re: Lunch today at noon?'".

The additional content may also include opaque, application-specific data. This opaque data may have no particular meaning to any application or service aside from those operated by email application 116 and email server 110. Thus, the opaque data may be a status update, configuration parameter, command, or other information that email server 110 shares with email application 116. The opaque data may be in the form of human-readable text, binary, or some combination thereof.

At step 504, messaging server A 112 may transmit a MESSAGING-NOTIFY message to push notification gateway 108. The transmission of this message may be triggered by an instant message for the user of client device 102 arriving at messaging server A 112, or some other state change occurring at messaging server A. Like email server 110, messaging server A 112 may be configured to transmit some or all notification messages for the user of client device 102 to push notification gateway 108. Also like email server 110, this configuration may have been manually established, or may have occurred automatically in response to receiving a SUBSCRIBE message, such as the SUBSCRIBE message shown in step 434.

The MESSAGING-NOTIFY message may contain a copy of the token, an AppID, and additional content. The AppID may be a number, text string, or other type of indicator that denotes that the sender of the MESSAGING-NOTIFY message operates according to a particular type of messaging service. The AppID contained in this message may be different from an AppID contained in EMAIL-NOTIFY messages.

As the case for email services, some messaging services may use one AppID, while other messaging services may use a different AppID. Also as the case for EMAIL-NOTIFY messages, inclusion of an AppID in a MESSAGING-NOTIFY message is optional, as push notification gateway 108 may be able to infer the AppID of the messaging service from other information in the MESSAGING-NOTIFY message, such as the source IP address of the MESSAGING-NOTIFY message.

Similar to the EMAIL-NOTIFY message, a MESSAGING-NOTIFY message may also contain additional content (denoted "content2"). The additional content may include one or more strings and/or fields, possibly of human-readable text, non-human-readable text, or in a binary format. For example, the content may include a textual message that is to be displayed to the user of client device 102. An example of such a textual message may be "A new instant message has arrived". Alternatively or additionally, the textual message may include information from one or more headers of the new instant message, such as the sender's name or userid, and at least part of the instant message. For instance, the textual message might include the text "New message from Bob123@example.com", or "From Bob123@example.com: Lunch today at noon?" The additional content may also include opaque, application-specific data.

At step 506, push notification gateway 108 may transmit a NOTIFY message to push notification server 124. In some embodiments, this NOTIFY message may be transmitted in response to push notification gateway 108 receiving one or more notifications from various push servers. In such cases, the NOTIFY message of step 506 includes information from the notifications that push notification gateway 108 received at steps 502 and 504. However, instead of combining the notifications into a single NOTIFY message, push notification gateway 108 may instead transmit a separate NOTIFY message for each notification.

An example of the information contained in the NOTIFY message of step 506 is shown below. In this example, the information is encoded in an HTTP-based JSON format. Thus, the HTTP header indicates that the Content-Type of the NOTIFY message is JSON. Further, the body of the NOTIFY message encodes both notifications in associative arrays.

```
HTTP Header:
Content-Type: application/json;charset=utf-8HTTP
Body:
{
    "responses" : [
    {
        "type" : "notification",
        "appid" : "123",
        "timestamp" : "1234567890" ,
        "alertText" : "You have a new email",
        "appContext" : "serverMessageid=1234" },
    {
        "type" : "notification",
        "appid" : "456",
        "timestamp" : "1234567890" ,
        "alertText" : "You have a new message",
        "appContext" : "A1B2C3D4E5F6" }
    ]
}
```

The notification from email server 110 is of type "notification." The AppID is 123, indicating that the notification originates from the email service operated by email server 110. The timestamp indicates the time at which push notification gateway 108 received the notification. The content of the notification (i.e., "content1") includes an alert text ("alertText") of "You have a new email", and an application context ("appContext") of "serverMessageid=1234". This application context may be opaque data, and in this case may indicate an identification of a newly-arrived email message that triggered the sending of the notification.

The notification from messaging server A 112 is also of type "notification." The AppID is 456, indicating that the notification originates from the messaging service operated by messaging server A 112. The timestamp indicates the time at which push notification gateway 108 receives the notification. The content of the notification (i.e., "content2") includes an alert text of "You have a new message", and an application context of "A1B2C3D4E5F6". This application context may be opaque data indicating application-specific information.

At step 508, push notification server 124 may determine whether email application 116 is operating on client device 102. Push notification server 124 may make this determination by querying the operating system of client device 102 for a list of active applications, tasks, threads, or processes, or by some other mechanism. If email application 116 is operating, at step 510 push notification server 124 may transmit a NOTIFY message to email application 116. This NOTIFY may be of the same or different format as that of the NOTIFY message of step 506, and may be routed via the port on which email application 116 registered at step 412. Alternatively, push notification server 124 may use some form of inter-process communication, message passing, or shared memory to convey the NOTIFY message of step 510 to email application 116.

Upon receiving this NOTIFY message, email application 116 may either process the message or ignore it. For instance, if email application 116 processes the message, email application 116 may present in a pop-up window, dialog box, or some other type of display, with the alert text "You have a new email" on the user interface of client device 102. Further, in response to receiving this NOTIFY message, email application 116 may communicate with email server 110 to download or otherwise acquire any new messages that have arrived at email server 110.

At step 512, push notification server 124 may determine whether messaging application A 118 is operating on client device 102. As in step 508, push notification server 124 may make this determination by querying the operating system of client device 102 for a list of active applications, tasks, threads, or processes, or by some other mechanism. If messaging application A 118 is operating, at step 514 push notification server 124 may transmit a NOTIFY message to messaging application A 118. This NOTIFY message may be of the same or a different format as that of the NOTIFY messages of steps 506 and 510, and may be routed via the port on which messaging application A 118 registered at step 432. Alternatively, push notification server 124 may use some form of inter-process communication, message passing, or shared memory to convey the NOTIFY message of step 514 to messaging application A 118.

Like email application 116, messaging application A 118 may either process or ignore this NOTIFY message. For instance, if messaging application A 118 processes the message, messaging application A 118 may present in a pop-up window, dialog box, or some other type of display, the alert text "You have a new message" on the user interface of client device 102. Further, in response to receiving this NOTIFY message, messaging application A 118 may communicate with messaging server A 112 to download or otherwise acquire any new messages that have arrived at messaging server A 112. Alternatively, the NOTIFY message of step 514 may contain at least some of the information that triggered messaging server A 112 to transmit the MESSAGING-NOTIFY message.

d. Connection Termination

Figure 6:
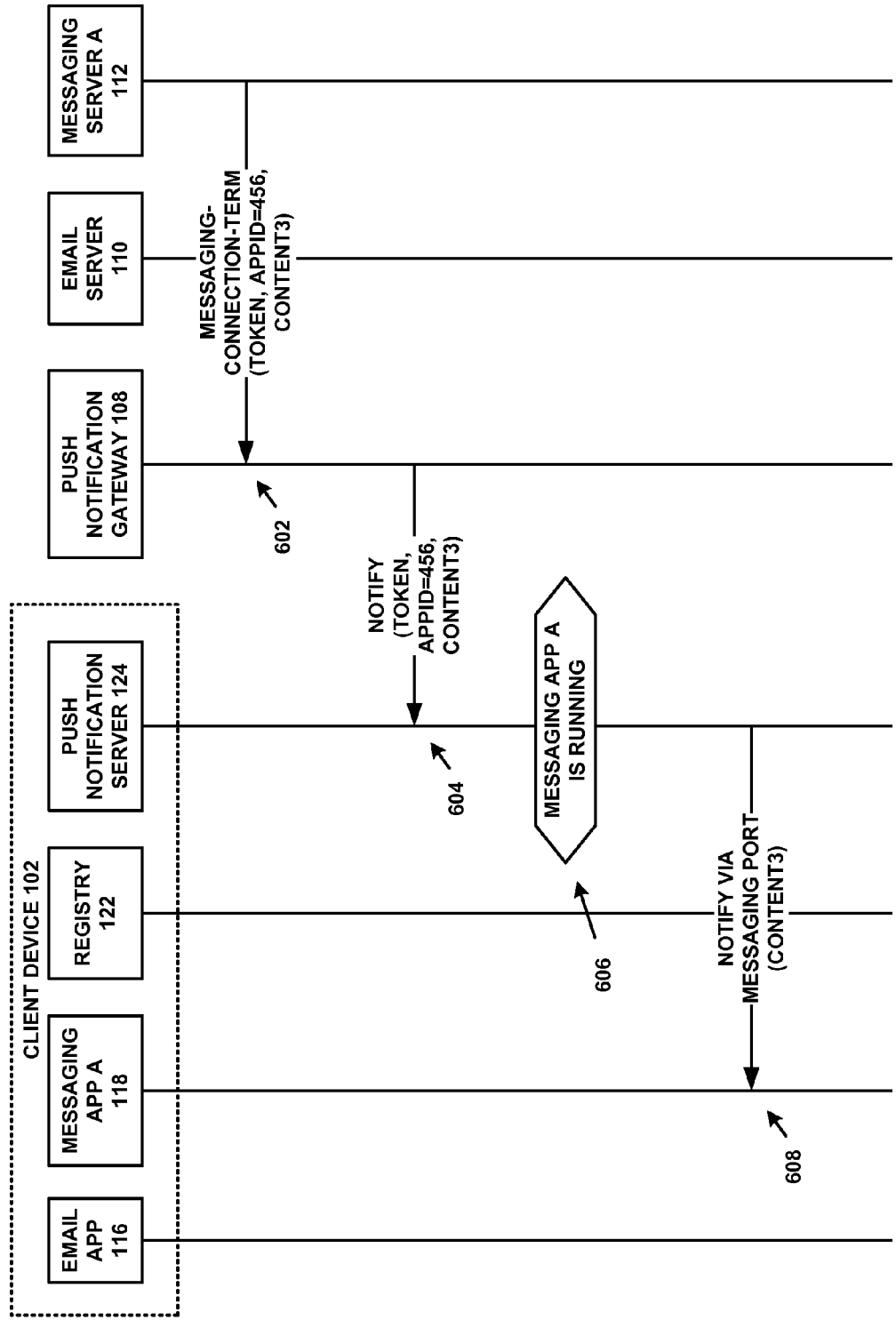
FIG. 6 is a fifth message flow, in accordance with an example embodiment.
Figure 7:
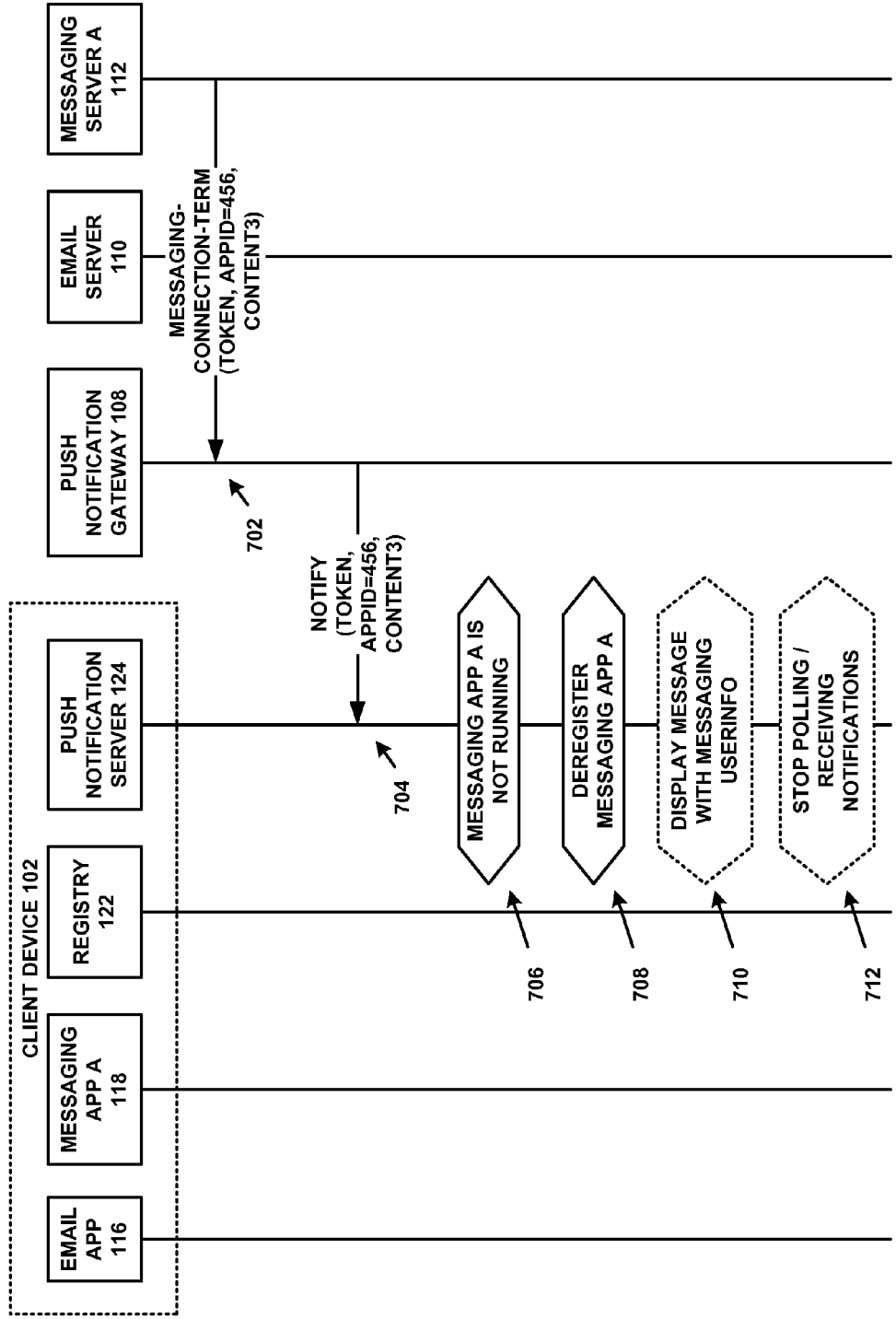
FIG. 7 is a sixth message flow, in accordance with an example embodiment.

FIGS. 6 and 7 depict delivery of connection termination messages to client device 102. In some embodiments, a connection termination message is a special type of notification that informs client device 102 that a particular push notification server is no longer providing push services for a given application. For example, some instant messaging services only allow users to be logged on via one client device at a time. If a user who is logged on to such an instant messaging service via client device 102 later logs on to the instant messaging service via a different client device, the instant messaging server may terminate its association with client device 102, and transmit a connection termination message notifying client device 102 of this occurrence. Push notification server 124, may respond to a connection termination message in various ways, some of which are illustrated in FIGS. 6 and 7.

At step 602 of FIG. 6, messaging server A 112 may transmit a MESSAGING-CONNECTION-TERM message to push notification gateway 108. The transmission of this message may be triggered by messaging server A 112 determining to terminate its association with client device 102, or by some other state change occurring at messaging server A 112. As noted above, messaging server A 112 may be configured to transmit some or all notification messages for the user of client device 102 to push notification gateway 108. The MESSAGING-CONNECTION-TERM message may include the token, the AppID of the messaging service used by messaging server A 112, and/or application-specific content (e.g., "content3").

At step 604, possibly in response to receiving the MESSAGING-CONNECTION-TERM message, push notification gateway 108 may transmit a NOTIFY message to push notification server 124. This NOTIFY message may use a different format than the MESSAGING-CONNECTION-TERM message. An example of possible content of this NOTIFY message is shown below.

```
HTTP Header:
    Content-Type: application/json;charset=utf-8HTTP
Body:
{
    "responses" : [
    {
        "type" : "notification",
        "appid" : "456",
        "timestamp" : "1234567890" ,
        "alertText" : "You have been logged in elsewhere",
        "connectionTerm" : "true",
        "appContext" : "abc...xyz" }
    ]
}
```

Much of the information in this NOTIFY message may be similar or the same as that of the NOTIFY message of step 506. In this case, however, the alert text field contains the text "You have been logged in elsewhere". Further, this NOTIFY message contains the additional field "connectionTerm", which in the case of this message, takes on a value of "true". This additional field may indicate that the purpose of the NOTIFY message is to inform client device 102 that the messaging association between client device 102 and messaging server A 112 has been terminated.

In response to receiving the NOTIFY message of step 604, at step 606 push notification server 124 may determine whether messaging application A 118 is operating on client device 102. As the case for step 512, push notification server 124 may make this determination by querying the operating system of client device 102 for a list of active applications, tasks, threads, or processes, or by some other mechanism.

If push notification server 124 determines that messaging application A 118 is operating on client device 102, at step 608 push notification server 124 may transmit a NOTIFY message to messaging application A 118. This NOTIFY may be of the same or a different format as that of the NOTIFY message of step 606, and may be routed via the port on which messaging application A 118 registered at step 432. Alternatively, push notification server 124 may use some form of inter-process communication, message passing, or shared memory to convey the NOTIFY message of step 514 to messaging application A 118

In response to receiving the NOTIFY message of step 608, messaging application A 118 may display the alert text of this message and/or conclude operation on client device 102. Alternatively, messaging application A 118 may ignore this message and/or continue operating. In some embodiments, messaging application A 118 may ignore the message and/or continue operating because a user is using messaging application A 118, or to provide a user with an opportunity to log in to the messaging service facilitated by messaging application A 118.

FIG. 7 illustrates possible embodiments in which messaging application A 118 is not operating on client device 102 when push notification server 124 receives a connection termination message. There are several potential scenarios in which an application that is not operating remains registered with a push notification service. For instance, the application may have terminated, but did not deregister with the push notification service prior to terminating. Alternatively, the application may have attempted to deregister with the push notification service prior to terminating, but failed to do so properly (e.g., a message indicating the deregistration may have been lost on the network between the client device and the push notification gateway). As described below, the push notification server may display at least a portion of the user information on a user interface of the client device on behalf of the application. In this way, the user is notified regarding activity involving (or information regarding) the user's account with a push server, without the application having to be launched.

Steps 702 and 704 of FIG. 7 are similar to or the same as steps 602 and 604 of FIG. 6. At step 706, possibly in response to receiving the NOTIFY message of step 704, push notification server 124 may determine whether messaging application A 118 is operating on client device 102. As the case for steps 512 and 606, push notification server 124 may make this determination by querying the operating system of client device 102 for a list of active applications, tasks, threads, or processes, or by some other mechanism.

If push notification server 124 determines that messaging application A 118 is not operating on client device 102, at step 708 push notification server 124 may de-register messaging application A 118 from push notification server 124. This may involve push notification server 124 removing messaging application A 118 from a list of applications for which push notification server 124 forwards notifications. Alternatively or additionally, push notification server 124 may transmit a message to push notification gateway 108, instructing push notification gateway 108 not to forward any more notifications for messaging application A 118 to client device 102.

At step 710, push notification server 124 may optionally display an indication on the user interface of client device 102 on behalf of messaging application A 118. For example, this indication may include some or all of the alert text "You have been logged in elsewhere". Further, this indication may be personalized with the messaging user information that messaging application A 118 transmitted to push notification server 124 at step 428. For instance, push notification server 124 may insert a userid or email address from the messaging user information into the alert text, so that the alert text displays information such as "Alice456 has been logged in elsewhere" or "Alice456@example.com has been logged in elsewhere". An advantage of displaying application-specific user information upon receiving the connection termination message is that it allows push notification server 124 to inform the user of client device 102 about the application to which the alert text pertains.

At step 712, push notification server 124 may optionally stop listening for notifications. As noted above, a potential advantage of push notification is reduced network usage and conservation of processing cycles at both the push client and the push server. The use of push notification server 124 and push notification gateway 108 in the manner described herein may result in these advantages for one or more push services. However, once there are no longer any push applications that are registered with push notification server 124 and operating on client device 102, there may be little reason for push notification server 124 to maintain a session with push notification gateway 108.

Thus, if at step 712 push notification server 124 determines that there are no applications operating on client device 102 that are subscribed to push notification services, push notification server 124 may close the socket with push notification gateway 108. Alternatively, push notification server 124 may keep the socket open, but ignore any notifications arriving from push notification gateway 108, and/or no longer poll push notification gateway 108 to keep the socket open. Further, push notification server 124 may instruct push notification gateway 108 to stop sending notifications to client device 102.

After step 712, if email application 116 or messaging application A 118 launches, these applications may re-register with push notification server 124 and re-subscribe to notifications from their respective servers. Thus, in some embodiments, the push notification services facilitated by push notification server 124 only remain active when applications operating on client device 102 are capable of receiving notifications.

V. Example Flow Charts

Figure 8:
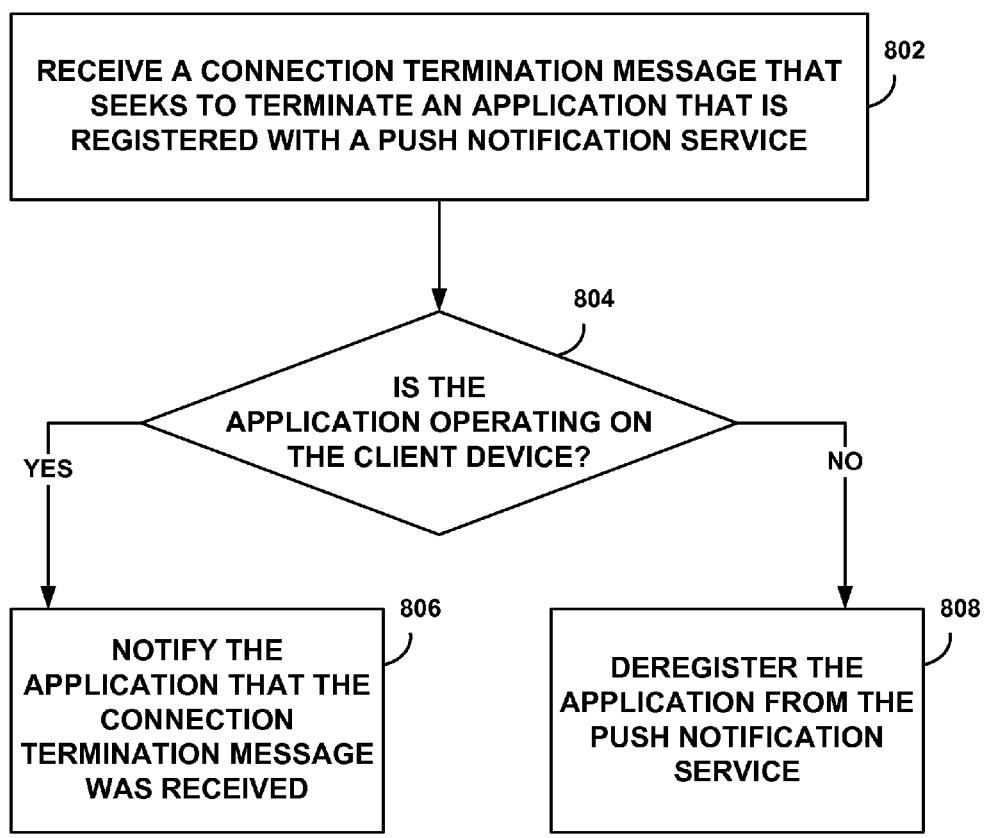
FIG. 8 is a first flow chart, in accordance with an example embodiment.
Figure 9:
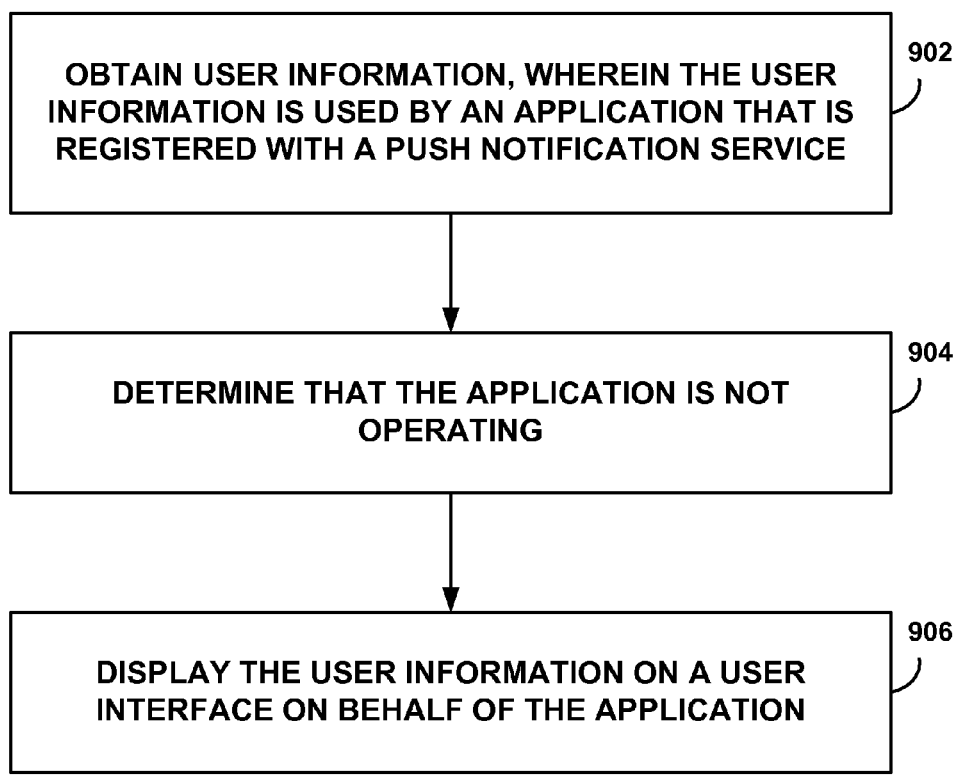
FIG. 9 is a second flow chart, in accordance with an example embodiment.

FIGS. 8 and 9 are flow charts that depict example embodiments through which enhanced push notifications may be facilitated. The methods illustrated by these flow charts could be used, for instance, with the components of communication system 100 in FIG. 1. In some embodiments, one or more blocks of these flow charts and may be performed by a device, such as client device 102. Although the blocks of flow charts are depicted in a particular order, these blocks may also be performed in parallel, and/or in a different order than those described herein. Also, the various blocks may be combined into fewer blocks, divided into additional blocks, and/or removed based upon the desired implementation.

Each block may represent a module, a segment, or a portion of program code, which includes one or more instructions executable by a processor for implementing specific logical functions or steps in the method. The program code may be stored on any type of computer readable medium, for example, such as a storage device including a disk or hard drive. The computer readable medium may include non-transitory computer readable media, for example, such as computer-readable media that stores data for short or long periods of time like register memory, processor cache and Random Access Memory (RAM). The computer readable medium may also include secondary or persistent long term storage, like read only memory (ROM), optical or magnetic disks, compact-disc read only memory (CD-ROM), for example. The computer readable media may also be any other volatile or non-volatile storage systems. In addition, for the flow charts in FIGS. 8 and 9, one or more blocks may represent circuitry that is wired to perform the specific logical functions.

At block 802 of FIG. 8, a push notification server may be operating on a client device. The push notification server may receive a connection termination message that seeks to terminate an application that is registered with a push notification service. In some embodiments, the push notification service may be facilitated by the push notification server, and/or the application may be capable of operating on the client device. At block 804, possibly in response to receiving the connection termination message, the push notification server may determine whether the application is operating on the client device.

If the application is operating on the client device, then at block 806 the push notification server may notify the application that the connection termination message was received. However, if the application is not operating on the client device, then at block 808 the push notification server may deregister the application from the push notification service.

In some embodiments, the push notification server may receive the connection termination message from a push notification gateway that also facilitates the push notification service. Additionally, the push notification server may poll the push notification gateway from time to time in order to receive at least some messages from the push notification gateway.

If the application is not operating on the client device, then after deregistering the application from the push notification service, the push notification server may determine that no applications operating on the client device are registered with the push notification service. Possibly in response to determining that no applications operating on the client device are registered with the push notification service, the push notification server may stop the polling of the push notification gateway and/or terminate the session between the push notification server and the push notification gateway.

Further, the client device may be capable of operating on battery power, and the interval at which the push notification server polls the push notification gateway may be based on the remaining battery life of the client device. For instance, suppose that the push notification server polls the push notification gateway at a polling interval. The push notification server may determine that a remaining battery life of the client device is below a battery life threshold (e.g., 50%, 30%, 20%, 10%, etc.) and that the client device is not being charged (e.g., the client device is not plugged in). In response to determining that the remaining battery life of the client device is below the battery life threshold and that the client device is not being charged, the push notification server may increasing the length of the polling interval, thus potentially conserving battery life of the client device.

In some embodiments, the application may register with a port of an SMS push registry on the client device. The push notification server may receive and store a reference to the port, and may use the port to deliver messages to the application. In scenarios where the application is operating on the client device, notifying the application that the connection termination message was received may involve translating at least part of the connection termination message to a format compatible with the SMS push registry, and forwarding the translated connection termination message to the application via the port.

Further, the connection termination message may contain an application identifier for the application and a data string (e.g., an opaque data string). Translating at least part of the connection termination message to the format compatible with the SMS push registry may involve using the application identifier to look up the port. Then, before forwarding the translated connection termination message to the application via the port, the push notification server may convert at least part of the data string in the connection termination message to a WMA TextMessage object in the translated connection termination message.

Additionally, the application may be configured with user information that the application uses to register with an application server associated with the application. The push notification server may store the user information. While the application is not operating on the client device, the push notification server may retrieve the stored user information and display at least some of the stored user information on a user interface of the client device.

Also, the application may determine whether the application is registered with the push notification service in order to select a dialog or window to display on the user interface of the client device. If the application is registered with the push notification service, the application may display a non-login dialog on a user interface of the client device. However, if the application is not registered with the push notification service, the application may display a login dialog on the user interface of the client device. In response to input received via the login dialog, the application may register with the push notification service via the push notification server. This received input may include user information, and registering with the push notification service may include the application providing the user information to the push notification server for the push notification server to store.

In addition, either serially or in parallel to the processing depicted in blocks 802, 804, 806, and 808, the push notification server may be able to perform similar or the same functions on behalf of a second application. Thus, the push notification server may receive a second connection termination message that seeks to terminate a second application that is registered with the push notification service. In response to receiving the second connection termination message, the push notification server may determine whether the second application is operating on the client device.

If the second application is operating on the client device, the push notification server may notify the second application that the second connection termination message was received. However, if the second application is not operating on the client device, the push notification server may deregister the second application from the push notification service.

At block 902 of FIG. 9, a push notification server may obtain user information that may be used by an application capable of operating on the client device. In some embodiments, the push notification server may also be operating on the client device, and the application may be registered with a push notification service facilitated by the push notification server. At block 904, the push notification server may determine that the application is not operating on the client device. At block 906, possibly in response to making this determination, the push notification server may display the user information on a user interface of the client device on behalf of the application.

Additionally, the push notification server may receive a connection termination message that seeks to terminate the application. Possibly in response to receiving the connection termination message, the push notification server may deregister the application from the push notification service.

It should be understood that FIGS. 8 and 9 depict non-limiting embodiments. Thus, more or fewer steps than shown in FIGS. 8 and 9 may be used without departing from the scope of the invention. Additionally, each of these steps may be repeated one or more times, or may be omitted altogether. Moreover, these steps may occur in a different order than shown in FIGS. 8 and 9. Further, the flow charts of these figures may be combined with one another, in whole or in part, also without departing from the scope of the invention. For instance, any of the additional features discussed in the context of FIG. 8 may also be applied to FIG. 9.

IV. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. Since many modifications, variations, and changes in detail can be made to the described examples, it is intended that all matters in the preceding description and shown in the accompanying figures be interpreted as illustrative and not in a limiting sense.

The invention claimed is:

1. A method comprising:
  a push notification server, operating on a client device, receiving a connection termination message, wherein the connection termination message seeks to terminate an application that is registered with a push notification service, wherein the push notification server receives the connection termination message from a push notification gateway that facilitates the push notification service, and wherein the push notification server polls the push notification gateway at a polling interval in order to receive messages from the push notification gateway;
  the push notification server determining that a remaining battery life of the client device is below a battery life threshold and that the client device is not being charged;
  in response to determining that the remaining battery life of the client device is below the battery life threshold and that the client device is not being charged, the push notification server increasing the length of the polling interval;
  in response to receiving the connection termination message, the push notification server determining whether the application is operating on the client device;
  if the application is operating on the client device, the push notification server notifying the application that the connection termination message was received; and
  if the application is not operating on the client device, the push notification server deregistering the application from the push notification service, after deregistering the application from the push notification service, the push notification server determining that no applications operating on the client device are registered with the push notification service, in response to determining that no applications operating on the client device are registered with the push notification service, the push notification server stopping the polling of the push notification gateway.

2. The method of claim 1, further comprising:
  the push notification server receiving a second connection termination message, wherein the second connection termination message seeks to terminate a second application that is registered with the push notification service;
  in response to receiving the second connection termination message, the push notification server determining whether the second application is operating on the client device;
  if the second application is operating on the client device, the push notification server notifying the second application that the second connection termination message was received; and
  if the second application is not operating on the client device, the push notification server deregistering the second application from the push notification service.

3. The method of claim 1, wherein the application registers with a port of a short message service (SMS) push registry on the client device, wherein the push notification server receives and stores a reference to the port, and wherein the push notification server uses the port to deliver messages to the application.

4. The method of claim 3, wherein the application is operating on the client device, and wherein notifying the application that the connection termination message was received comprises:
  translating at least part of the connection termination message to a format compatible with the SMS push registry; and
  forwarding the translated connection termination message to the application via the port.

5. The method of claim 4, wherein the connection termination message contains an application identifier for the application and a data string, and wherein translating the at least part of the connection termination message to the format compatible with the SMS push registry comprises:
  using the application identifier to look up the port; and
  before forwarding the translated connection termination message to the application via the port, converting the data string in the connection termination message to a Wireless Messaging API (WMA) TextMessage object in the translated connection termination message.

6. The method of claim 1, wherein the application is configured with user information that the application uses to register with an application service associated with the application, and wherein the push notification server stores the user information, the method further comprising:
  while the application is not operating on the client device, the push notification server retrieving the stored user information and displaying the stored user information on a user interface of the client device.

7. The method of claim 1, further comprising:
  the application determining whether the application is registered with the push notification service;
  if the application is registered with the push notification service, the application displaying a non-login dialog on a user interface of the client device; and
  if the application is not registered with the push notification service, the application displaying a login dialog on the user interface of the client device.

8. The method of claim 7, wherein the application is not registered with the push notification service, the method further comprising:
  in response to input received via the login dialog, the application registering with the push notification service via the push notification server, wherein the received input includes user information, and wherein registering with the push notification service comprises the application providing the user information to the push notification server for the push notification server to store.

9. An article of manufacture including a non-transitory computer-readable medium, having stored thereon program instructions that, when executed by a client device, cause the client device to perform operations comprising:
  receiving a connection termination message, wherein the connection termination message seeks to terminate an application that is registered with a push notification service, wherein the connection termination message is received from a push notification gateway that facilitates the push notification service, and wherein the client device polls the push notification gateway at a polling interval in order to receive messages from the push notification gateway;
  determining that a remaining battery life of the client device is below a battery life threshold and that the client device is not being charged;
  in response to determining that the remaining battery life of the client device is below the battery life threshold and that the client device is not being charged, increasing the length of the polling interval;
in response to receiving the connection termination message, determining whether the application is operating on the client device;
if the application is operating on the client device, notifying the application that the connection termination message was received; and
if the application is not operating on the client device, deregistering the application from the push notification service, after deregistering the application from the push notification service, determining that no applications operating on the client device are registered with the push notification service, and in response to determining that no applications operating on the client device are registered with the push notification service, the client device stopping the polling of the push notification gateway.

10. The article of manufacture of claim 9, wherein the application registers with a port of a short message service (SMS) push registry on the client device, wherein the client device receives and stores a reference to the port, and wherein the client device uses the port to deliver messages to the application.

11. The article of manufacture of claim 10, wherein the application is operating on the client device, and wherein notifying the application that the connection termination message was received comprises:
translating at least part of the connection termination message to a format compatible with the SMS push registry; and
forwarding the translated connection termination message to the application via the port.

12. The article of manufacture of claim 11, wherein the connection termination message contains an application identifier for the application and a data string, and wherein translating the at least part of the connection termination message to the format compatible with the SMS push registry comprises:
using the application identifier to look up the port; and
before forwarding the translated connection termination message to the application via the port, converting the data string in the connection termination message to a Wireless Messaging API (WMA) TextMessage object in the translated connection termination message.

13. The article of manufacture of claim 9, wherein the application is configured with user information that the application uses to register with an application service associated with the application, wherein the client device stores the user information independently from the application, and wherein the computer-readable medium has stored thereon further program instructions that, when executed by the client device, cause the client device to perform operations comprising:
while the application is not operating on the client device, retrieving the stored user information and displaying the stored user information on a user interface of the client device.

14. The article of manufacture of claim 13, wherein the application is not registered with the push notification service, and wherein the computer-readable medium has stored thereon further program instructions that, when executed by the client device, cause the client device to perform operations comprising:
in response to input received via a login dialog, the application registering with the push notification service, wherein the received input includes the user information.

15. A method comprising:
a push notification server, operating on a client device, receiving a connection termination message, wherein the connection termination message seeks to terminate an application that is registered with a push notification service, wherein the application registers with a port of a short message service (SMS) push registry on the client device, wherein the push notification server receives and stores a reference to the port, and wherein the push notification server uses the port to deliver messages to the application;
in response to receiving the connection termination message, the push notification server determining whether the application is operating on the client device;
if the application is operating on the client device, the push notification server notifying the application that the connection termination message was received, wherein notifying the application that the connection termination message was received comprises translating at least part of the connection termination message to a format compatible with the SMS push registry, and forwarding the translated connection termination message to the application via the port; and
if the application is not operating on the client device, the push notification server deregistering the application from the push notification service.

16. The method of claim 15, further comprising:
the push notification server receiving a second connection termination message, wherein the second connection termination message seeks to terminate a second application that is registered with the push notification service;
in response to receiving the second connection termination message, the push notification server determining whether the second application is operating on the client device;
if the second application is operating on the client device, the push notification server notifying the second application that the second connection termination message was received; and
if the second application is not operating on the client device, the push notification server deregistering the second application from the push notification service.

17. The method of claim 15, wherein the connection termination message contains an application identifier for the application and a data string, and wherein translating the at least part of the connection termination message to the format compatible with the SMS push registry comprises:
using the application identifier to look up the port; and
before forwarding the translated connection termination message to the application via the port, converting the data string in the connection termination message to a Wireless Messaging API (WMA) TextMessage object in the translated connection termination message.

18. The method of claim 15, wherein the application is configured with user information that the application uses to register with an application service associated with the application, and wherein the push notification server stores the user information, the method further comprising:
while the application is not operating on the client device, the push notification server retrieving the stored user information and displaying the stored user information on a user interface of the client device.

19. The method of claim 15, further comprising:
the application determining whether the application is registered with the push notification service;

if the application is registered with the push notification service, the application displaying a non-login dialog on a user interface of the client device; and if the application is not registered with the push notification service, the application displaying a login dialog on the user interface of the client device.

20. The method of claim 19, wherein the application is not registered with the push notification service, the method further comprising:

in response to input received via the login dialog, the application registering with the push notification service via the push notification server, wherein the received input includes user information, and wherein registering with the push notification service comprises the application providing the user information to the push notification server for the push notification server to store.

* * * * *